United States Patent Office 3,391,117
Patented July 2, 1968

3,391,117
COPOLYMERS OF PHENOL, HCHO, 2,7-DIHYDROXYNAPHTHALENE AND KOH
Norman Bilow, Los Angeles, and Leroy J. Miller, Canoga Park, Calif., assignors to the United States of America as represented by the Secretary of the Air Force
No Drawing. Filed Oct. 22, 1965, Ser. No. 502,692
4 Claims. (Cl. 260—57)

ABSTRACT OF THE DISCLOSURE

Copolymers of phenol with 2,7-dihydroxynaphthalene and formaldehyde which are resitsant to dimensional change up to 2000° C. under an oxidizing environment containing at least 20% oxygen and 80% nitrogen and are useful as an ablative material in rocket nozzles.

---

The invention relates to ablative plastics and more specifically to a new and improved composition of matter for use as rocket nozzles and the like, and to a process by which it is made.

In the past, phenoformaldehyde resins have been found to be the best thermosetting char forming plastics for use in applications at temperatures above 1,000° C., such as for ablative rocket nozzles.

It has been demonstrated that copolymers of phenol with 2,7-hydroxynaphthalene and formaldehyde exhibit markedly superior high temperature properties when compared with other phenolic polymers. The copolymers of phenol with 2,7-dihydroxynaphthalene, when exposed to temperatures of up to 2,000° C., undergo smaller dimensional changes than do other phenolic polymers. This characteristic is retained in an oxidizing environment of up to at least 20% oxygen and 80% nitrogen, by weight.

The process, by which the product that is disclosed herein is made, starts with a water solution containing 4.5 grams of 2,7-dihydroxynaphthalene, 10.6 grams of phenol, 0.57 gram of potassium hydroxide and 18.0 grams of 37% by weight formaldehyde water solution.

The solution of the above composition is placed in a reflux condensing flask and is heated at its refluxing temperature for 2¼ hours.

The resulting reflux mixture is then diluted by the addition thereto of about 60 milliliters of ethanol and is rapidly chilled in an ice bath. The chilled solution containing the ethanol is then acidified by the addition thereto of dilute hydrochloric acid until it has a pH of 3 to 4. Other alkalies and acids may be substituted for those stipulated herein where desired and where advantages result from the use thereof. The acidified solution is then added to a large quantity of water, thereby forcing the copolymer to precipitate. The copolymer is then collected and is purified by causing its reprecipitation.

The copolymer so made and purified is soluble in the lower alcohols, such as in methyl and ethyl alcohols. The alcohol solutions of the copoylmers are suitable for their use as lacquers from which laminates may be prepared.

One specific example of the use of the copolymer so made is in the fabrication of ablative rocket nozzles. The copolymer is suitable for use in most of the high temperature applications where other phenol formaldehyde resins are currently being used.

The composition and the process that are disclosed herein have been submitted as being successfully operative embodiments of the present invention. It is to be understood that chemical equivalents and substitutions for reactants, temperatures, process steps, etc., as limited modifications of the invention, may be made without departing from the spirit and the scope of the invention.

What is claimed is:
1. The ablative plastic composition of matter that is dimensionally stable up to 2000° C. under an oxidizing environment of at least up to by weight of 20% oxygen in nitrogen consisting of the recovered reaction product of refluxing a water solution of a mixture of 2,7-hydroxynaphthalene, phenol, formaldehyde and potassium hydroxide.

2. The ablative plastic composition of matter that is dimensionally stable up to 2,000° C. under an oxidizing environment of at least up to by weight 20% oxygen in nitrogen consisting of the recovered reaction product of refluxing together in water for 2¼ hours, 4½ grams of 2,7-dihydroxynaphthalene, 10.6 grams of phenol, 0.57 gram of potassium hydroxide and 18 grams by weight of 37% formaldehyde water solution.

3. The process for making an ablative plastic copolymer comprising the steps of refluxing a mixture of 2,7-dihydroxynapthalene, phenol, formaldehyde, and potassium hydroxide for about 2¼ hours and recovering the copolymer by (a) diluting the refluxed mixture with ethanol, (b) chilling the resulting ethanol mixture, (c) adjusting the chilled mixture to a pH of 3 to 4, (d) adding water to the resulting mixture to effect the separation of the copolymer, (3) collecting the polymer, and (f) purifying the same by reprecipitation.

4. The process for making a copolymer by combining in a water solution 4.5 grams of 2,7-dihydroxynaphthalene, 10.6 grams phenol, 0.57 gram of potassium hydroxide, and 18 grams of 37% formaldehyde solution, placing the solution in a reflux condensing flask and heating the solution at its refluxing temperature for about 2¼ hours, diluting the refluxed solution by the addition thereto of about 60 milliliters of ethanol, rapidly chilling the ethanol solution on an ice bath, acidifying the chilled ethanol solution by the additon thereto of dilute hydrochloric acid to a pH of 3 to 4, adding the acidified ethanol solution to a sufficiently large quantity of water to force the copolymer to precipitate, collecting the copolymer, and purifying the copolymer by causing its reprecipitation.

References Cited

UNITED STATES PATENTS

| | | | |
|---|---|---|---|
| 1,609,367 | 12/1926 | Kulas et al. | 260—57 |
| 2,728,741 | 12/1955 | Simon et al. | 260—43 |
| 2,927,096 | 3/1960 | Soloway | 260—51 |

FOREIGN PATENTS

| | | |
|---|---|---|
| 662,615 | 5/1963 | Canada. |

WILLIAM H. SHORT, *Primary Examiner.*
H. E. SCHAIN, *Assistant Examiner.*